United States Patent
Estevez et al.

(10) Patent No.: US 10,717,551 B2
(45) Date of Patent: *Jul. 21, 2020

(54) SYSTEMS AND METHODS FOR DEPLOYING A SPACECRAFT ARRANGEMENT

(71) Applicant: The Boeing Company, Chicago, IL (US)

(72) Inventors: Miguel A. Estevez, Los Angeles, CA (US); Jason D. Flathom, Irvine, CA (US); Gary E. Lemke, Torrance, CA (US); Dennis Yoichi Nakasone, Redondo Beach, CA (US); Christopher P. Volk, Manhattan Beach, CA (US); Elvis D. Silva, Denver, CO (US)

(73) Assignee: The Boeing Company, Chicago, IL (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/430,058

(22) Filed: Jun. 3, 2019

(65) Prior Publication Data
US 2020/0024010 A1    Jan. 23, 2020

Related U.S. Application Data

(63) Continuation of application No. 15/373,166, filed on Dec. 8, 2016, now Pat. No. 10,351,268.

(51) Int. Cl.
*B64G 1/64* (2006.01)
*B64G 1/00* (2006.01)
*B64G 1/10* (2006.01)

(52) U.S. Cl.
CPC ............ *B64G 1/645* (2013.01); *B64G 1/002* (2013.01); *B64G 1/1085* (2013.01); *B64G 1/641* (2013.01); *B64G 2001/643* (2013.01)

(58) Field of Classification Search
CPC ... B64G 1/10; B64G 1/22; B64G 1/64; B64G 1/641; B64G 1/645; B64G 2001/1092; B64G 2001/643
See application file for complete search history.

(56) References Cited

U.S. PATENT DOCUMENTS

| 4,854,526 A | 8/1989 | Rochefort et al. |
| 5,052,640 A | 10/1991 | Chang et al. |

(Continued)

FOREIGN PATENT DOCUMENTS

| EP | 1038772 A2 | 9/2000 |
| EP | 1038772 A3 | 7/2001 |

(Continued)

OTHER PUBLICATIONS

English translation of Eurasian Search Report prepared by the Eurasian Patent Office in application No. 201792011, completed May 18, 2018.

(Continued)

*Primary Examiner* — Richard R. Green
*Assistant Examiner* — Michael A. Fabula
(74) *Attorney, Agent, or Firm* — McDonnell Boehnen Hulbert & Berghoff LLP

(57) ABSTRACT

A spacecraft system includes a plurality of spacecraft in a stack. The stack has one or more layers, each layer includes at least two spacecraft, and each spacecraft is releasably coupled to one or more adjacent spacecraft in the stack. The spacecraft system also includes a controller configured to, for each layer, (i) cause the layer to release from the stack, and (ii) after the layer releases from the stack, cause the at least two spacecraft in the layer to release from each other.

20 Claims, 15 Drawing Sheets

(56) References Cited

U.S. PATENT DOCUMENTS

| | | |
|---|---|---|
| 5,098,042 A | 3/1992 | Viale et al. |
| 5,152,482 A | 10/1992 | Perkins et al. |
| 5,199,672 A | 4/1993 | King et al. |
| 5,221,171 A | 6/1993 | Rudoy et al. |
| 5,411,226 A | 5/1995 | Jones et al. |
| 5,466,163 A | 11/1995 | Barron et al. |
| 5,522,569 A | 6/1996 | Steffy et al. |
| 5,605,308 A | 2/1997 | Quan et al. |
| 5,613,653 A | 3/1997 | Bombled et al. |
| 5,860,624 A | 1/1999 | Obry et al. |
| 5,884,866 A | 3/1999 | Steinmeyer et al. |
| 6,138,951 A | 10/2000 | Budris et al. |
| 6,260,804 B1 | 7/2001 | Anderson et al. |
| 6,357,698 B1 | 3/2002 | DiVerde et al. |
| 9,027,889 B2 | 5/2015 | Aston et al. |
| 9,296,206 B2 | 3/2016 | Achatz et al. |
| 9,463,882 B1 | 10/2016 | Field et al. |
| 10,351,268 B2 * | 7/2019 | Estevez .................. B64G 1/645 |
| 2002/0000495 A1 | 1/2002 | DiVerde et al. |
| 2008/0135687 A1 | 6/2008 | Penzo et al. |
| 2008/0237399 A1 | 10/2008 | Caplin et al. |
| 2013/0221162 A1 | 8/2013 | Darooka et al. |
| 2013/0299641 A1 | 11/2013 | Aston et al. |
| 2014/0131522 A1 | 5/2014 | Smith et al. |
| 2016/0046397 A1 | 2/2016 | Aston et al. |
| 2016/0075453 A1 | 3/2016 | Sauzay et al. |
| 2016/0304219 A1 | 10/2016 | Tadros et al. |
| 2016/0318635 A1 | 11/2016 | Field et al. |
| 2017/0355474 A1 | 12/2017 | Busche et al. |
| 2018/0093786 A1 | 4/2018 | Schwarz et al. |
| 2018/0111707 A1 | 4/2018 | Poncet et al. |
| 2018/0265227 A1 | 9/2018 | Cheynet de Beaupre et al. |

FOREIGN PATENT DOCUMENTS

| | | |
|---|---|---|
| RU | 2428358 | 9/2016 |
| RU | 2574103 | 10/2016 |

OTHER PUBLICATIONS

NASA/National Aeronautics and Space Administration, "Spacecraft." Web address is http://mms.gsfc.nasa.gov/spacecraft.html; dated Sep. 29, 2016 (2 pages).

* cited by examiner

SYSTEMS AND METHODS FOR DEPLOYING A SPACECRAFT ARRANGEMENT

CROSS-REFERENCE TO RELATED APPLICATION

This application is a continuation of U.S. patent application Ser. No. 15/373,166, filed on Dec. 8, 2016, the contents of which is hereby incorporated by reference in its entirety.

FIELD

The present disclosure generally relates to spacecraft systems and methods, and more particularly to, systems and methods for deploying multiple spacecraft from a launch vehicle.

BACKGROUND

Unless otherwise indicated herein, the materials described in this section are not prior art to the claims and are not admitted to be prior art by inclusion in this section.

To reduce launch costs, many launch vehicles used to carry a payload into outer space have been designed to simultaneously carry a plurality of spacecraft such as, for example, satellites. In one approach, the launch vehicle includes a dedicated dispenser system, which separately supports each spacecraft during lift-off and then individually dispenses each spacecraft in orbit. One drawback is that the dispenser system tends to be relatively bulky and heavy, which reduces the useable payload that can be carried into orbit by the launch vehicle.

SUMMARY

A method and system for deploying spacecraft from a launch vehicle is disclosed. In an example, a spacecraft system includes a plurality of spacecraft in a stack. The stack has one or more layers, each layer includes at least two spacecraft, and each spacecraft is releasably coupled to one or more adjacent spacecraft in the stack. The spacecraft system also includes a controller configured to, for each layer, (i) cause the layer to release from the stack, and (ii) after the layer releases from the stack, cause the at least two spacecraft in the layer to release from each other In another example, a method of deploying a plurality of spacecraft from a launch vehicle is disclosed. The plurality of spacecraft are in a stack having one or more layers, each layer includes at least two spacecraft, and each spacecraft is releasably coupled to one or more adjacent spacecraft in the stack. The method includes (i) releasing, layer by layer, the one or more layers from the stack, and (ii) for each layer, after releasing the layer from the stack, releasing the at least two spacecraft of the layer from each other.

In another example, disclosed is a non-transitory computer-readable medium having stored thereon, program instructions that when executed by a controller, causes a spacecraft system to perform a set of acts. The spacecraft system includes a plurality of spacecraft in a stack, the stack has one or more layers, each layer includes at least two spacecraft, and each spacecraft is releasably coupled to one or more adjacent spacecraft in the stack. The set of acts include (i) releasing, layer by layer, the one or more layers from the stack, and (ii) for each layer, after releasing the layer from the stack, releasing the at least two spacecraft of the layer from each other.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

DETAILED DESCRIPTION

I. Overview

Figure 1:
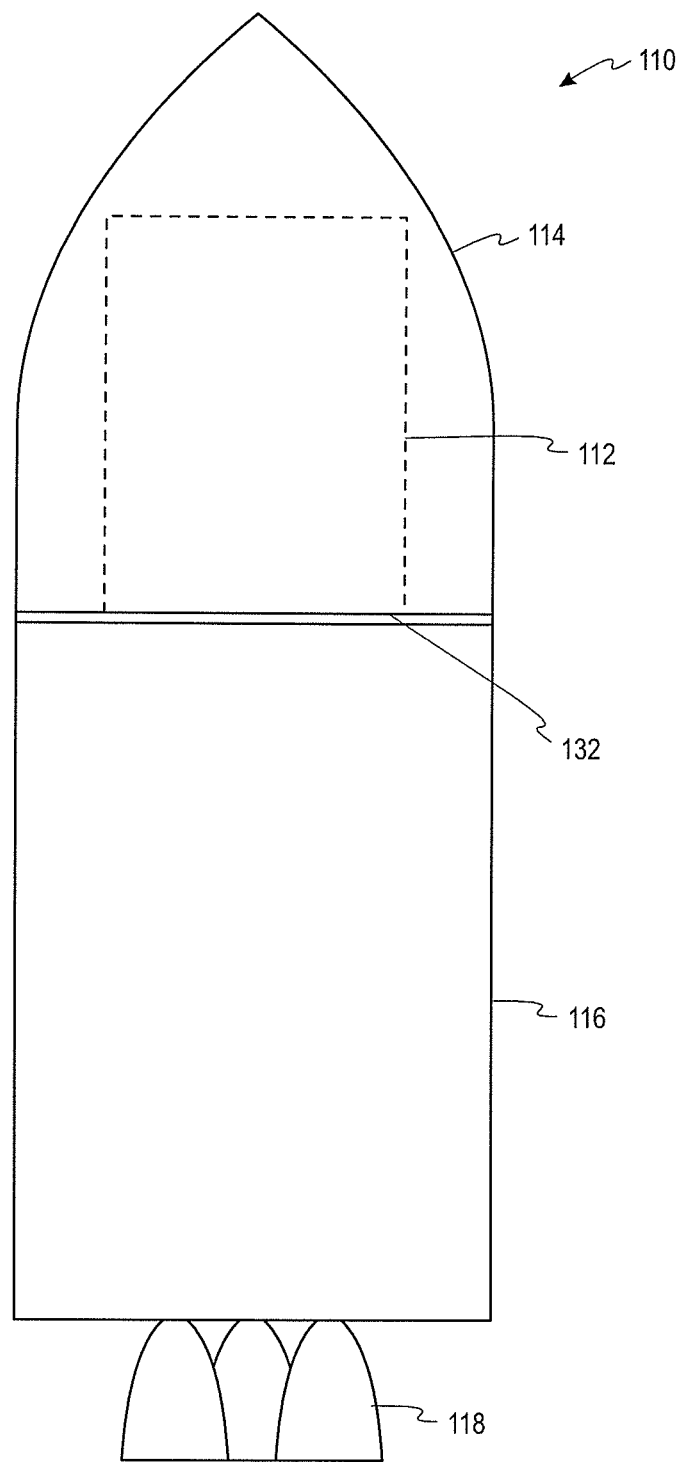
FIG. 1 depicts a simplified diagram of a rocket according to an example embodiment.

The methods and systems of the present disclosure provide spacecraft systems and methods for deploying multiple spacecraft from a launch vehicle. The spacecraft can be, for example, satellites and/or interplanetary probes. As an example, the launch vehicle can be a rocket for carrying a payload from a planetary surface into outer space.

Within examples, a spacecraft system includes a plurality of spacecraft arranged in a stack. The stack has one or more layers and each layer has at least two spacecraft. Each of the spacecraft in the stack is releasably coupled to one or more adjacent spacecraft, which can be in the same layer as the spacecraft, an adjacent layer immediately above the spacecraft, and/or an adjacent layer immediately below the spacecraft.

The spacecraft system can further include an adaptor that couples the stack of spacecraft to a launch vehicle. The adaptor can have a first end releasably coupled to a bottom-most layer of the stack and a second end configured to couple to a support surface of the launch vehicle. In some instances, the support surface of one type of launch vehicle may differ from the support surface of another type of launch vehicle. To adapt the spacecraft system to a variety of different launch vehicles, a set of adaptors can be provided with a plurality of second end configurations, which respectively correspond to the support surfaces of different types of launch vehicles. As such, the spacecraft system can be readily deployed in a variety of different types of launch vehicles by selecting, from among the set of adaptors, an adaptor corresponding to a particular type of launch vehicle to be used for a particular launch of the spacecraft system.

The spacecraft system can include a plurality of releasable fasteners that releasably couple the spacecraft to the adjacent spacecraft and/or the adaptor. In general, each releasable fastener is actuatable to provide a mechanical release of respective components coupled to one another by the releasable fastener. For example, each releasable fastener can couple respective components of the spacecraft system to each other in a first state of the releasable fastener and release the respective components from each other in a second state of the releasable fastener. Each releasable fastener can be selectively actuated between the first state and the second state responsive to a signal received from a controller.

In one aspect, the controller can transmit signals to the releasable fasteners to thereby cause the layers of spacecraft to release, layer by layer, from the stack. For each layer, after the layer releases from the stack, the controller can transmit further signals to cause the spacecraft in the layer to release from each other. In one example, the controller causes the layers to release from the stack, layer by layer, in an order from a top-most layer of the stack to the bottom-most layer of the stack. In another example, if a fault is detected, the controller can cause the stack to release from the adaptor and then cause the layers to release, layer by layer, in an order from the bottom-most layer to the top-most layer. By the term "top-most layer," it is meant the layer in the stack that is farthest from the launch vehicle. By the term "bottom-most layer," it is meant the layer in the stack that is closest to the launch vehicle.

The spacecraft system can further include a plurality of biasing devices, which can facilitate separating the layers from the stack and/or the spacecraft from each other responsive to the controller releasing the layers from the stack and/or the spacecraft from each other. By applying biasing forces to facilitate separating the layers and/or spacecraft from each other, the risk of collisions between the spacecraft can be reduced or minimized. Additionally, using biasing devices to apply biasing forces can provide for passive separation of the spacecraft, which can help to conserve fuel for thrusters that may be used for other purposes during operation of the spacecraft (e.g., to maintain the spacecraft in an assigned orbital slot).

In an example, the biasing devices can cause each layer to rotate as the layer separates from the stack. For instance, for each layer of the stack, at least one of the biasing devices can apply a different biasing force to the layer than at least another of the biasing devices to cause the layer to rotate as the layer separates from the stack. In an implementation, the layer can rotate about an axis normal to a direction of the sun. By rotating the layer about an axis normal to the direction of the sun, the spacecraft of the layer can be more equally exposed to the sun during each rotation. This can facilitate providing a thermally and power stable configuration of the spacecraft in the layer during separation from the stack.

The spacecraft system of the present disclosure provides a number of advantages over conventional spacecraft dispensing systems. For example, because the spacecraft are releasably coupled to each other in a stack, the spacecraft system can omit a bulky and heavy structure of conventional dispenser systems. As such, the spacecraft system of the present disclosure can deploy spacecraft in greater quantities, sizes, and/or weights per launch than conventional dispenser systems for a given launch vehicle.

II. Example Systems

FIG. 1 depicts a rocket 110 including a spacecraft system 112 according an example of the disclosure. As shown in FIG. 1, the rocket 110 includes a fairing 114 coupled to a launch vehicle 116. The launch vehicle 116 provides a rocket engine for propelling the rocket 110 during launch and/or flight. For example, the launch vehicle 116 can include one or more internal fuel chambers containing a rocket fuel (i.e., a propellant), combustion chambers, and/or rocket engine nozzles 118. The combustion chamber can combust the rocket fuel to produce a hot, high pressure gas, which the rocket engine nozzle 118 exhausts away from the launch vehicle 116. The rocket engine nozzle 118 can accelerate the gas received from the combustion chamber to facilitate converting thermal energy of the gas into kinetic energy of the launch vehicle 116. Within examples, the launch vehicle 116 can include a single engine stage or a plurality of engine stages, which separate and ignite in sequence.

The fairing 114 is coupled to the launch vehicle 116 and encloses the spacecraft system 112 to protect the spacecraft system 112 from aerodynamic forces during flight through an atmosphere. The fairing 114 can then separate from the launch vehicle 116 after the aerodynamic forces drop below a certain value and/or the launch vehicle 116 reaches a particular location. By separating the fairing 114 from the launch vehicle 116, the spacecraft system 112 can be exposed to an external environment such as, for example, outer space. The spacecraft system 112 can then deploy into orbit a plurality of spacecraft such as, for example, satellites and/or interplanetary probes, as described below.

Figure 2:
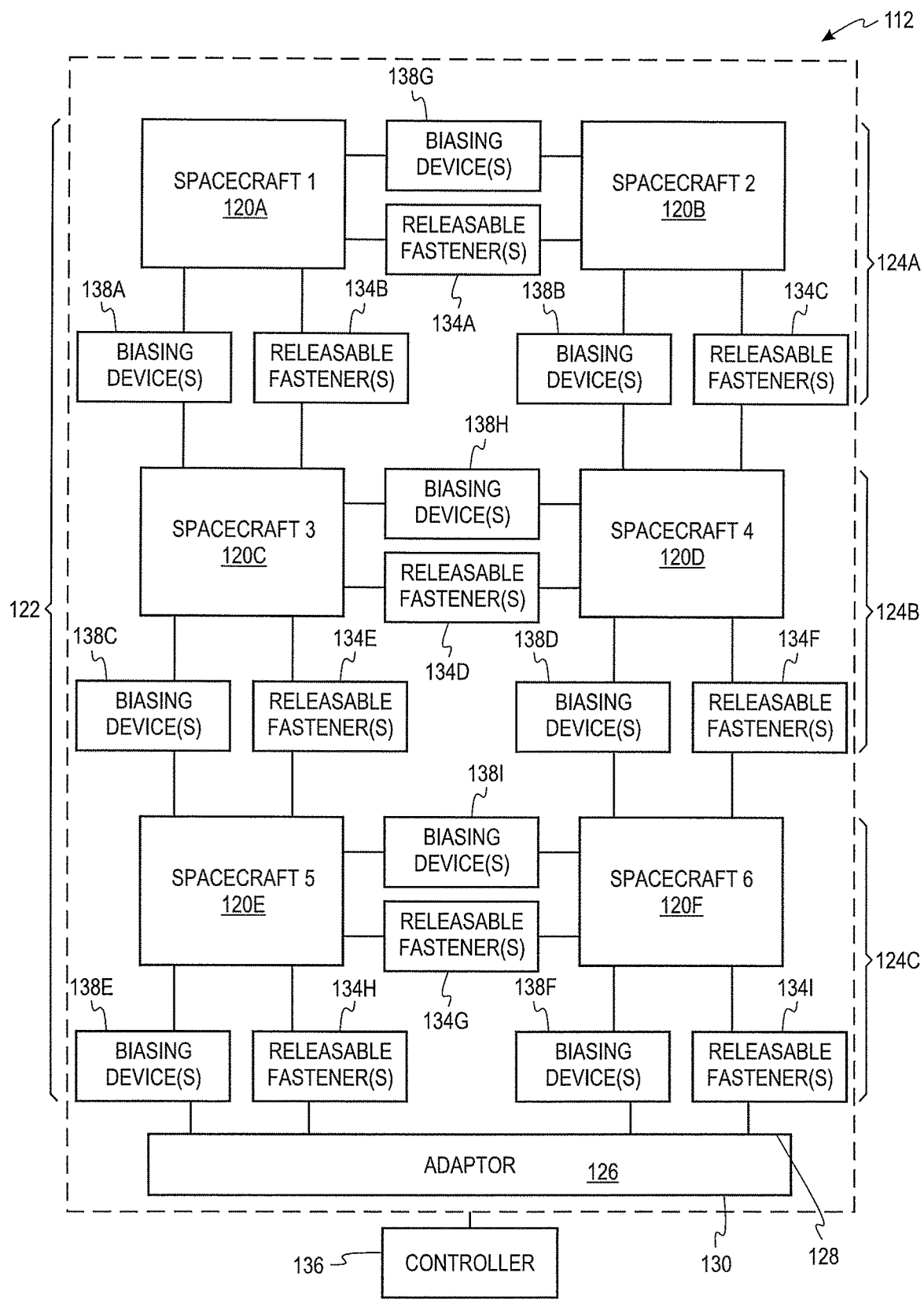
FIG. 2 depicts a simplified block diagram of a spacecraft system according to an example embodiment.

FIG. 2 depicts a simplified diagram of the spacecraft system 112 according to an example of the disclosure. As shown in FIG. 2, the spacecraft system 112 includes a plurality of spacecraft 120A-120F arranged in a stack 122, which has a plurality of layers 124A-124C with at least two spacecraft 120A-120F per layer 124A-124C. More particularly, the spacecraft system 112 includes a first layer 124A having a first spacecraft 120A and a second spacecraft 120B, a second layer 124B having a third spacecraft 120C and a fourth spacecraft 120D, and a third layer 124C having a fifth spacecraft 120E and a sixth spacecraft 120F. The first layer 124A is a top-most layer of the stack 122 and the third layer 124C is a bottom-most layer of the stack 122. As shown in FIG. 2, the third layer 124C is releasably coupled to a first end 128 of an adaptor 126. A second end 130 of the adaptor 126 is configured to couple to the launch vehicle 116.

Although the spacecraft system 112 includes three layers 124A-124C in the example depicted by FIG. 2, the spacecraft system 112 can include a greater quantity of layers 124A-124C or a fewer quantity of layers 124A-124C in another example. Hence, the quantity of layers 124A-124C may be more than three or as few as one (e.g., layer 124C) such that release from the adaptor 126 may be accomplished as herein shown and described. Similarly, although the spacecraft system 112 includes two spacecraft 120A-120F per layer 124A-124C in the example depicted by FIG. 2, the spacecraft system 112 can include more than two spacecraft 120A-120F per layer 124A-124C in another example.

Within examples, the spacecraft system 112 can include an even quantity or an odd quantity of spacecraft 120A-120F per layer 124A-124C.

Further, while multiple spacecraft 120A-120F are shown in each layer 124A-124C, it is not necessary that each spacecraft 120A-120F be identical with or arranged symmetrically with other spacecraft 120A-120F in the same layer 124A-124C. Rather, in some examples, it is only necessary that the assembled spacecraft 120A-120F in the particular layer 124A-124C have substantially the same height and fit within the contours of the fairing 114 to ensure the stability of each layer 124A-124C. In this manner, spacecraft 120A-120F of different sizes and volumes may be grouped together in a layer 124A-124C having a uniform height. Further, in this manner, a plurality of spacecraft 120A-120F may be arranged in a stack 122, wherein the stack 122 has one or more layers 124A-124C and each layer 124A-124C includes at least two spacecraft 120A-120F. Each spacecraft 120A-120F in a layer 124A-124C may be releasably coupled vertically to one or more adjacent spacecraft 120A-120F in the stack 122 as well as horizontally in a layer 124A-124C. The terms vertical and horizontal are relative terms and not intended to convey an absolute orientation.

Additionally, within examples, the quantity of layers 124A-124C and/or the quantity of spacecraft 120A-120F per layer 124A-124C can be determined based on at least one factor selected from a group of factors including the type of launch vehicle 116 used to transport the spacecraft system 112, the type of spacecraft 120A-120F to be deployed, a total spacecraft constellation size, a quantity of spacecraft per orbit plane and/or altitude, a spacecraft constellation design life and replenishment plan, collision on launch assessment (COLA) requirements, a spacecraft constellation orbit phasing, and/or constellation crosslink, a final orbital altitude of the spacecraft 120A-120F, a mass of each individual spacecraft 120A-120F, and/or a capability of the selected launch vehicle 116.

Each spacecraft 120A-120F is releasably coupled to one or more adjacent spacecraft 120A-120F in the stack 122 and/or the adaptor 126. For example, in FIG. 2, the first spacecraft 120A is releasably coupled to the second spacecraft 120B and the third spacecraft 120C. The second spacecraft 120B is releasably coupled to the first spacecraft 120A and the fourth spacecraft 120D. The third spacecraft 120C is releasably coupled to the first spacecraft 120A, the fourth spacecraft 120D, and the fifth spacecraft 120E. The fourth spacecraft 120D is releasably coupled to the second spacecraft 120B, the third spacecraft 120C, and the sixth spacecraft 120F. The fifth spacecraft 120E is releasably coupled to the third spacecraft 120C, the sixth spacecraft 120F, and the adaptor 126. The sixth spacecraft 120F is releasably coupled to the fourth spacecraft 120D, the fifth spacecraft 120E, and the adaptor 126.

To releasably couple the spacecraft 120A-120F to each other and/or the adaptor 126 as described above, the spacecraft system 112 includes a plurality of releasable fasteners 134A-134I. In general, each releasable fastener 134A-134I is actuatable to provide a mechanical release of respective components (i.e., spacecraft 120A-120I and/or adaptor 126) coupled to one another by the releasable fastener 134A-134I. For example, each releasable fastener 134A-134I can couple respective components of the spacecraft system 112 to each other in a first state and release the respective components from each other in a second state. The releasable fastener 134A-134I can be selectively actuated between the first state and the second state responsive to a signal received from a controller 136 (e.g., via wired and/or wireless communication).

The controller 136 can be implemented using hardware, software, and/or firmware. For example, controller 136 can include one or more processors and a non-transitory computer readable medium (e.g., volatile and/or non-volatile memory) that stores machine language instructions or other executable instructions. The instructions, when executed by the one or more processors, may cause controller 136 to carry out the various operations of the spacecraft system 112 described herein. Within examples, the controller 136 can be on the rocket 110 and/or at a ground control station.

In FIG. 2, the plurality of releasable fasteners 134A-134I include one or more first releasable fastener(s) 134A that releasably couple the first spacecraft 120A and the second spacecraft 120B, one or more second releasable fastener(s) 134B that releasably couple the first spacecraft 120A and the third spacecraft 120C, one or more third releasable fastener(s) 134C that releasably couple the second spacecraft 120B and the fourth spacecraft 120D, one or more fourth releasable fastener(s) 134D that releasably couples the third spacecraft 120C and the fourth spacecraft 120D, one or more fifth releasable fastener(s) 134E that releasably couple the third spacecraft 120C and the fifth spacecraft 120E, one or more sixth releasable fastener(s) 134F that releasably couple the fourth spacecraft 120D and the sixth spacecraft 120F, one or more seventh releasable fastener(s) 134G that releasably couple the fifth spacecraft 120E and the sixth spacecraft 120F, one or more eighth releasable fastener(s) 134H that releasably couple the fifth spacecraft 120E and the adaptor 126, and one or more ninth releasable fastener(s) 134I that releasably couple the sixth spacecraft 120F and the adaptor 126.

As examples, the releasable fasteners 134A-134I can include marman bands, separation nuts, frangible nuts, separation bolts, bolt cutters, wire cutters, cable cutters, split spool devices (e.g., fusible wires and/or shaped-memory alloy wires), solenoid actuated nuts, pin pushers, and/or pin pullers. As further examples, in some implementations, each releasable fastener 134A-134I can include a pyrotechnic charge that can be activated remotely by the controller 136 to cause the pyrotechnic charge to break the releasable fastener 134A-134I into pieces and thereby release the components coupled by the releasable fastener 134A-134I. In other implementations, the releasable fastener 134A-134I can include a non-explosive actuator that can be activated remotely by the controller 136. The type of releasable fasteners 134A-134I used in the spacecraft system 112 can be determined based on one or more factors including, for example, susceptibility to electromagnetic interference, release response time, release shock, capability to withstand launch loads, capability to sustain preloads, power input to actuate, weight, size, temperature sensitivity, and/or release reliability.

As noted above, the controller 136 can transmit signals to selectively actuate one or more releasable fasteners 134A-134I at a time. According to an aspect of the disclosure, the controller 136 is configured to cause the layers 124A-124C of spacecraft 120A-120F to release, layer by layer, from the stack 122 and the adaptor 126. In one example, the controller 136 is configured to cause the layers 124A-124C to release in an order from the top-most layer 124A in the stack 122 to the bottom-most layer 124C in the stack 122. For instance, the controller 136 can transmit a first signal to actuate the second releasable fastener(s) 134B and the third releasable fastener(s) 134C and thereby cause the first layer 124A to release from the stack 122. The controller 136 can then transmit a second signal to actuate the fifth releasable fastener(s) 134E and the sixth releasable fastener(s) 134F and thereby release the second layer 124B from the stack 122. The controller 136 can further transmit a third signal to actuate the eighth releasable fastener(s) 134H and the ninth releasable fastener(s) 134I to release the third layer 124C from the adaptor 126.

When each layer 124A-124C releases from the stack 122 and/or the adaptor 126, the spacecraft 120A-120F within the layer 124A-124C are coupled to each other. For each layer 124A-124C, the controller 136 can transmit an additional signal to cause the spacecraft 120A-120F in the layer 124A-124C to release from each other after the layer 124A-124C releases from the stack 122 and/or the adaptor 126. For example, after the first layer 124A releases from the stack 122, the controller 136 can transmit a signal to actuate the first releasable fastener(s) 134A and thereby cause the first spacecraft 120A and the second spacecraft 120B to release from each other. Similarly, after the second layer 124B releases from the stack 122, the controller 136 can transmit a signal to actuate the fourth releasable fastener(s) 134D and thereby cause the third spacecraft 120C and the fourth spacecraft 120D to release from each other. After the third layer 124C releases from the adaptor 126, the controller 136 can transmit a signal to actuate the seventh releasable fastener(s) 134G and thereby cause the fifth spacecraft 120E and the sixth spacecraft 120F to release from each other.

As also shown in FIG. 2, the spacecraft system 112 can include a plurality of biasing devices 138A-138I between respective components of the spacecraft system 112 such as, for instance, between adjacent spacecraft 120A-120F and/or between the spacecraft 120E-120F of the bottom-most layer 124C and the adaptor 126. The biasing devices 138A-138I apply biasing forces between the respective components of the spacecraft system 112 to urge the respective components away from each other. As such, while the releasable fasteners 134A-134I couple the respective components in the first state, the biasing forces applied by the biasing devices 138A-138I preload the releasable fasteners 134A-134I. Then, responsive to the controller 136 actuating the releasable fasteners 134A-134I from the first state to the second state, the biasing forces applied to the respective components by the biasing devices 138A-138I cause the components to separate from each other.

In FIG. 2, the biasing devices 138A-138I include a first set of interlayer biasing devices 138A-138F and a second set of intralayer biasing devices 138G-138I. The first set of interlayer biasing devices 138A-138F are between the adjacent layers 124A-124C of the stack 122, and between the bottom-most layer 124C and the adaptor 126. For example, in FIG. 2, the first set of interlayer biasing devices 138A-138F include one or more first biasing device(s) 138A between the first spacecraft 120A and the third spacecraft 120C, one or more second biasing device(s) 138B between the second spacecraft 120B and the fourth spacecraft 120D, one or more third biasing devices(s) 138C between the third spacecraft 120C and the fifth spacecraft 120E, one or more fourth biasing device(s) 138D between the fourth spacecraft 120D and the sixth spacecraft 120F, one or more fifth biasing device(s) 138E between the fifth spacecraft 120E and the adaptor 126, and one or more sixth biasing device(s) 138F between the sixth spacecraft 120F and the adaptor 126. The first set of interlayer biasing devices 138A-138F can thus apply biasing forces to the layers 124A-124C to facilitate separating each layer 124A-124C from the stack 122 after the layer 124A-124C releases from the stack 122.

In an implementation, the first set of interlayer biasing devices 138A-138F are configured to cause each layer 124A-124C to rotate as the layer 124A-124C separates from the stack 122 and/or the adaptor 126. For example, for each layer 124A-124C of the stack 122, at least one of the biasing devices 138A-138F can apply a different biasing force to the layer 124A-124C than at least another of the biasing devices 138A-138F such that the layer 124A-124C rotates as the layer 124A-124C separates from the stack 122.

In FIG. 2, for instance, the first biasing device(s) 138A can apply a different biasing force to the first layer 124A than the third biasing device(s) 138C to cause the first layer 124A to rotate as the first layer 124A separates from the stack 122. Additionally, the third biasing device(s) 138C can apply a different biasing force to the second layer 124B than the fourth biasing device(s) 138D to cause the second layer 124B to rotate as the second layer 124B separates from the stack 122. Similarly, the fifth biasing device(s) 138E can apply a different biasing force to the third layer 124C than the sixth biasing device(s) 138F to cause the third layer 124C to rotate as the third layer 124C separates from the adaptor 126.

In one example, the plurality of biasing devices 138A-138I can include a plurality of springs. For each layer 124A-124C of the stack 122, at least one of the springs can have a different characteristic than at least another of the springs such that the layer 124A-124C rotates as the layer 124A-124C separates from the stack 122. For instance, at least one of the springs can have a different spring constant than the at least another of the springs, and/or at least one of the springs can have a different length than at least another of the springs. In a further example, the springs can be provided in different quantities and/or locations with respect to the layer 124A-124C to cause the layer 124A-124C to rotate as the layer 124A-124C separates from the stack 122.

The second set of the intralayer biasing devices 138G-138I are between adjacent spacecraft 120A-120F within the same layer 124A-124C as each other. For example, in FIG. 2, the second set of intralayer biasing devices 138G-13I include one or more seventh biasing device(s) 138G between the first spacecraft 120A and the second spacecraft 120B in the first layer 124A, one or more eighth biasing device(s) 138H between the third spacecraft 120C and the fourth spacecraft 120D in the second layer 124B, and one or more ninth biasing device(s) 138I between the fifth spacecraft 120E and the sixth spacecraft 120F in the third layer 124C. The second set of intralayer biasing devices 138G-138I can thus apply biasing forces between the adjacent spacecraft 120A-120F to facilitate separating the adjacent spacecraft 120A-120F from each other after (i) the layer 124A-124C containing the adjacent spacecraft 120A-120F releases and separates from the stack 122, and (ii) the adjacent spacecraft 120A-120F in the layer 124A-124C release from each other.

Figure 3:
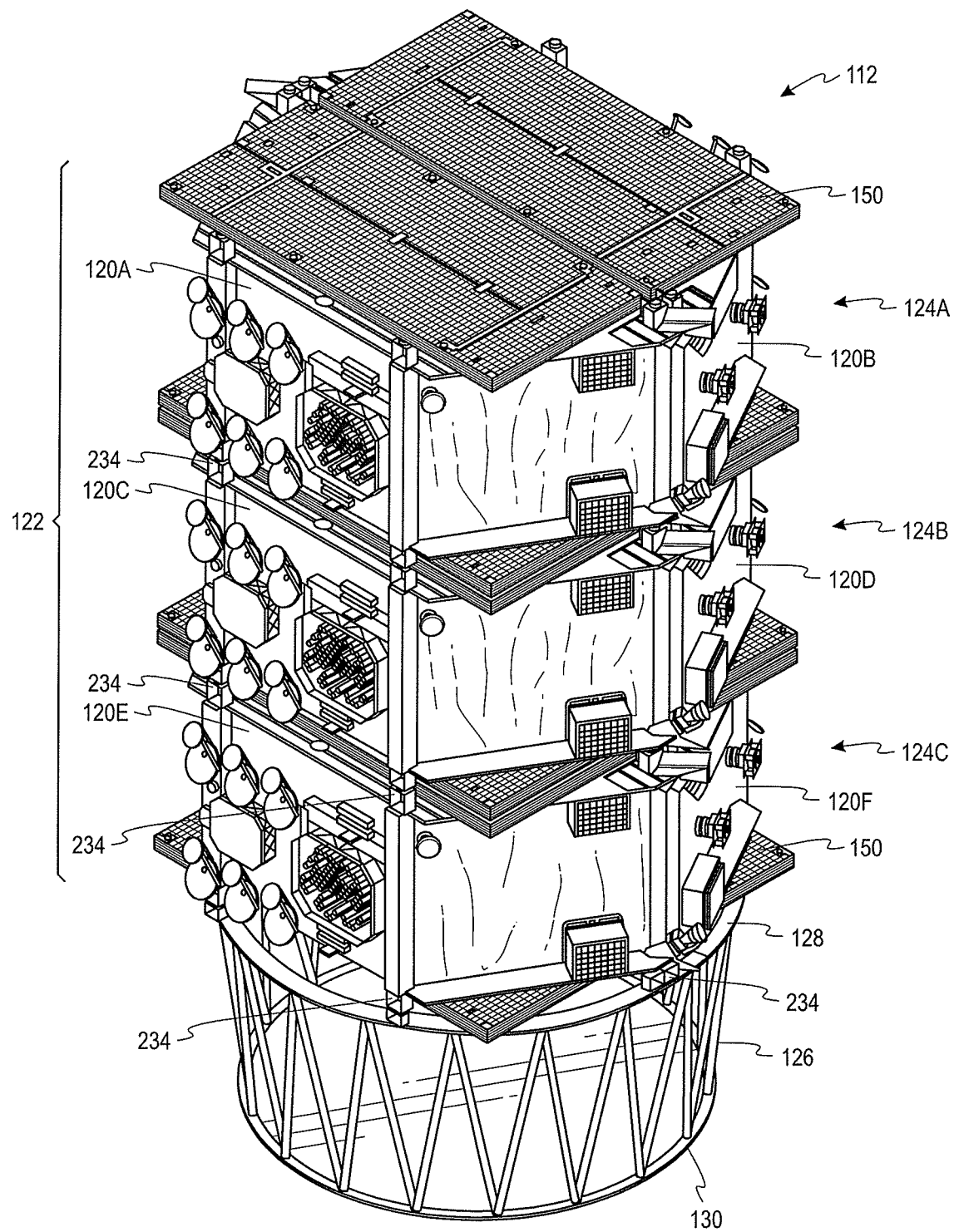
FIG. 3 depicts a perspective view of a spacecraft system according to an example embodiment.

FIG. 3 is a perspective view of the spacecraft system 112 according to an example. As shown in FIG. 3, the spacecraft system 112 includes the plurality of spacecraft 120A-120F arranged in the stack 122, the stack 122 has the plurality of layers 124A-124C, and each layer 124A-124C has at least two of the spacecraft 120A-120F. Additionally, in FIG. 3, each of the spacecraft 120A-120F is releasably coupled to one or more adjacent spacecraft 120A-120F, and the adaptor 126 is releasably coupled to the bottom-most layer 124C of the stack 122 as described above with respect to FIG. 2.

In the example shown in FIG. 3, the adjacent spacecraft 120A-120F and/or the adaptor 126 are coupled to each other by a plurality of releasable fasteners (e.g. releasable fastening devices) in the form of separation nuts 234; however, additional or alternative releasable fasteners can be used in other examples. Accordingly, as described above, the separation nuts 234 (i) couple the adjacent spacecraft 120A-120F and/or the adaptor 126 to each other in the first state and (ii) release the adjacent spacecraft 120A-120F and/or the adaptor 126 from each other in the second state. Also, as described above, the separation nuts 234 are actuatable between the first state and the second state responsive to signals received from the controller 136. The timing of the simultaneous or nearly simultaneous release of each of the plurality of separation nuts 234 is not critical as long as the described separation process is not substantially affected.

Figure 4A:
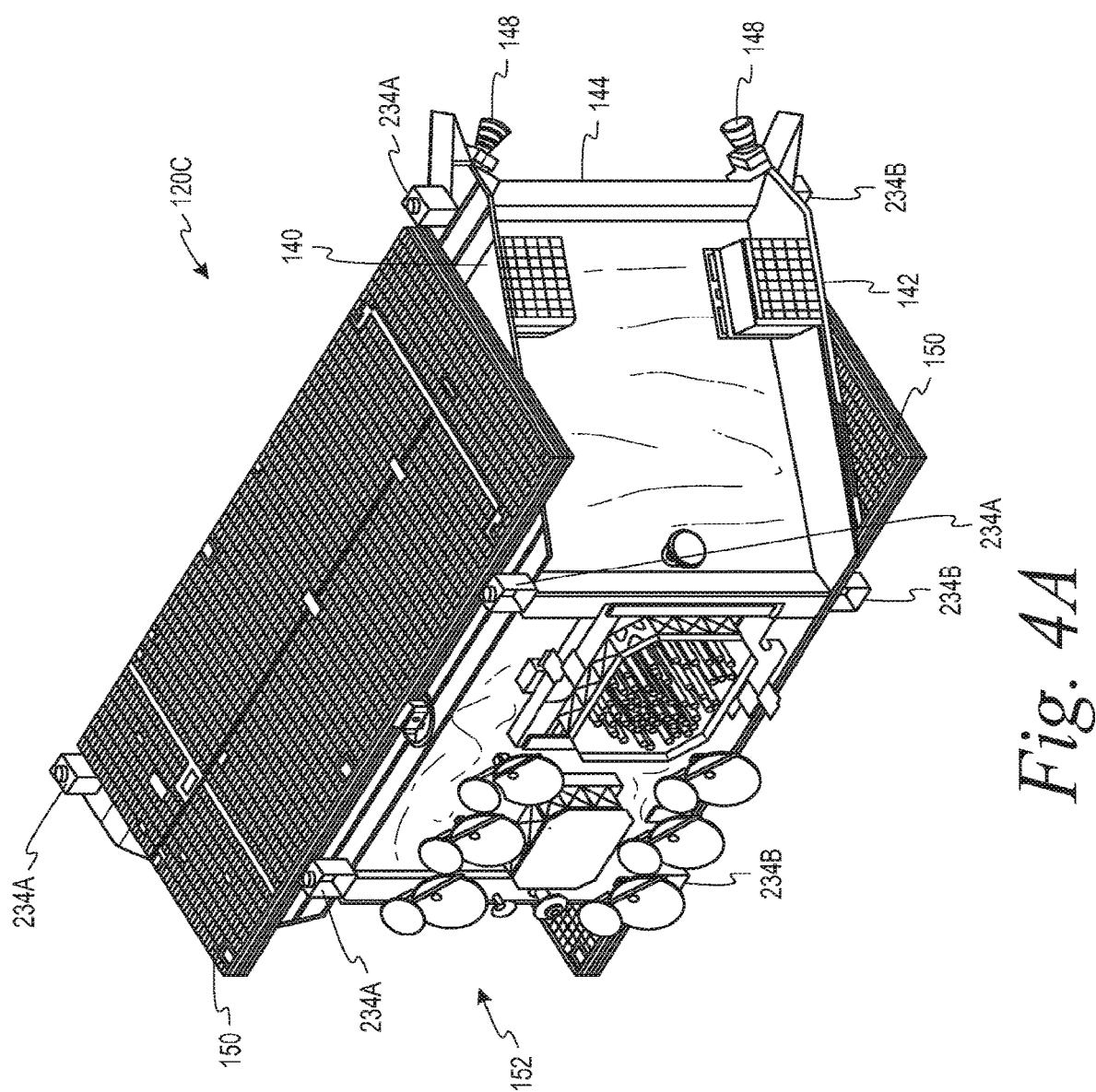
FIG. 4A depicts a perspective view of a spacecraft according to an example embodiment.
Figure 4B:
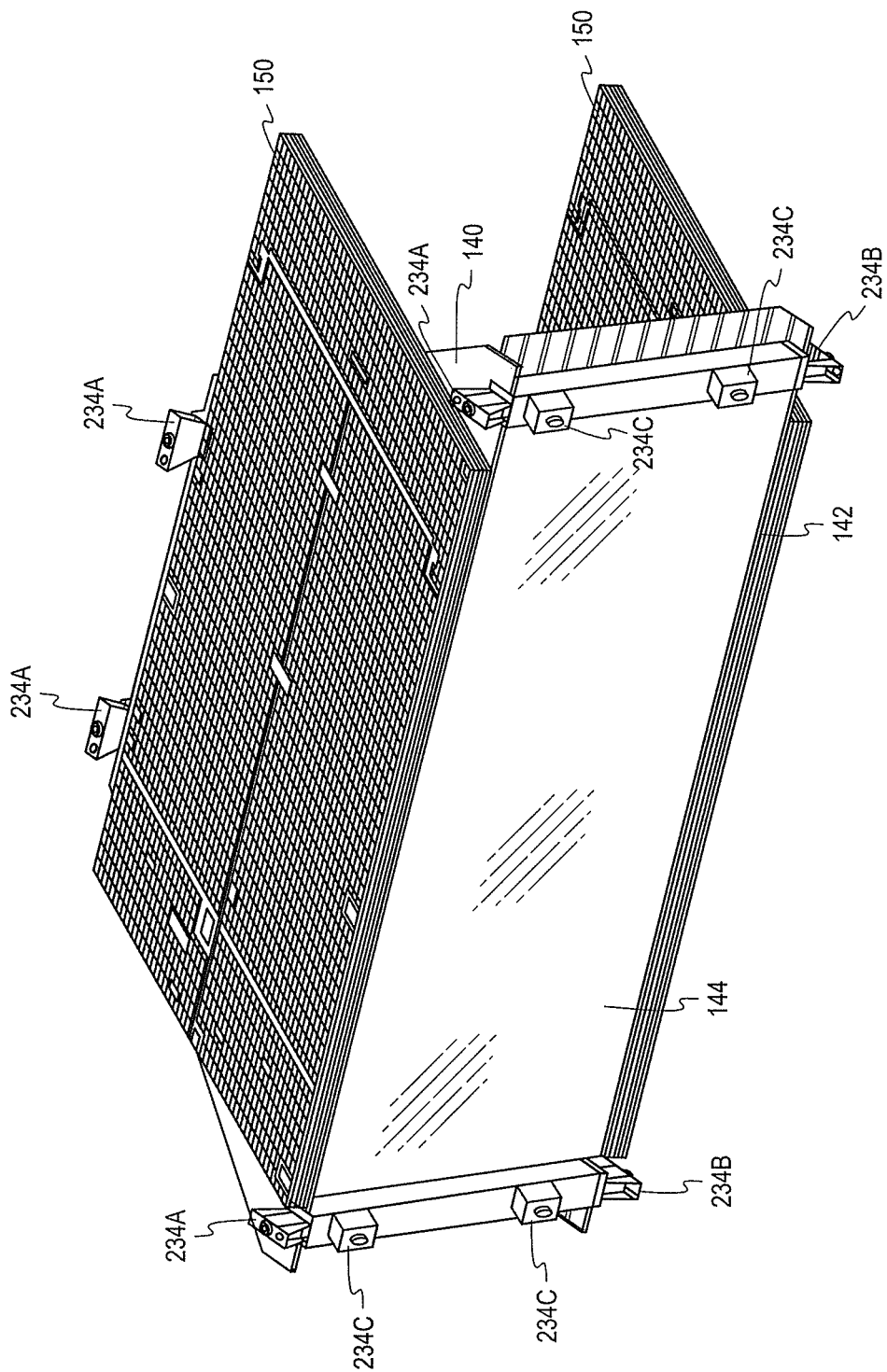
FIG. 4B depicts another perspective view of the spacecraft shown in FIG. 4A.

To further illustrate the separation nuts 234, FIG. 4A depicts a front perspective view and FIG. 4B depicts a rear perspective view of the third spacecraft 120C according to an example. As shown in FIGS. 4A-4B, the third spacecraft 120C includes a plurality of top separation nuts 234A on a top surface 140 of the spacecraft 120C, a plurality of bottom separation nuts 234B on a bottom surface 142 of the spacecraft 120C, and a plurality of lateral separation nuts 234C on a lateral surface 144 of the spacecraft 120C. The top separation nuts 234A are configured to releasably couple the spacecraft 120C to the adjacent spacecraft 120A in the layer 124A above the spacecraft 120C. The bottom separation nuts 234B are configured to releasably couple the spacecraft 120D to the adjacent spacecraft 120E in the layer 124C below the spacecraft 120C. The lateral separation nuts 234C are configured to releasably couple the spacecraft 120C to the adjacent spacecraft 120D in the same layer 124B as the spacecraft 120C.

Although the separation nuts 234A-234C are located at peripheral corners of the top surface 140, the bottom surface 142, and the lateral surface 144 in FIGS. 4A-4B, the separation nuts 234A-234C can be at different locations on the top surface 140, the bottom surface 142, and/or the lateral surface 144 in another example. Additionally, in another example, the top surface 140, the bottom surface 142, and/or the lateral surface 144 can include a greater or lesser quantity of separation nuts 234A-234C than the quantities of separation nuts 234A-234C depicted in FIGS. 4A-4B.

Figure 5:
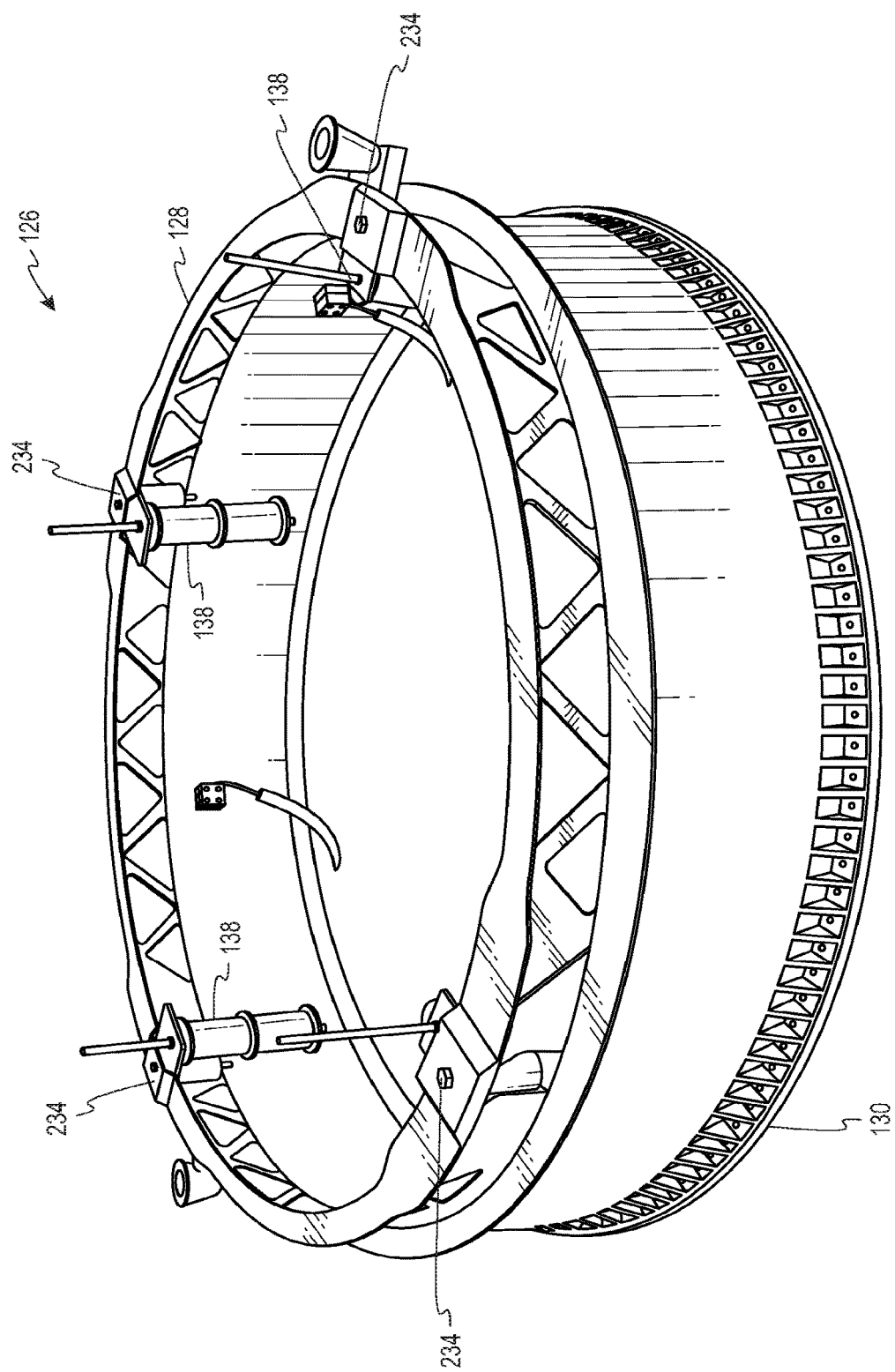
FIG. 5 depicts a perspective view of an adaptor according to an example embodiment.

Referring back to FIG. 3, the first end 128 of the adaptor 126 is coupled to the bottom-most layer 124C of the stack 122 and the second end 130 of the adaptor 126 is configured to couple to a support surface 132 (shown in FIG. 1) of the launch vehicle 116. FIG. 5 depicts a perspective view of the adaptor 126 according to an example of the disclosure. As shown in FIG. 5, the first end 128 can be configured according to a configuration of the bottom-most layer 124C. For example, the first end 128 can include a plurality of separation nuts 234 that couple with corresponding structures on the spacecraft 120E-120F of the bottom-most layer 124C of the stack 122. Additionally, for example, the first end 128 can include a plurality of biasing devices 138, which apply the biasing forces between the first end 128 of the adaptor 126 and the bottom-most layer 124C of the stack 122. As described above, the biasing devices 138 can thus facilitate separating the bottom-most layer 124C of the stack 122 from the adaptor 126 responsive to the separation nuts 234 actuating from the first state to the second state.

The second end 130 of the adaptor 126 has a configuration corresponding to the support surface 132 of the launch vehicle 116. As one example, the second end 130 can have a size and/or shape that corresponds to a size and/or shape of a feature on the support surface 132 such as, for example, a coupling mechanism and/or receptacle on the support surface 132 for receiving the second end 130.

In some instances, the support surface 132 of one type of launch vehicle 116 may differ from the support surface 132 of another type of launch vehicle 116. To adapt the spacecraft system 112 to a variety of different launch vehicles 116, a set of adaptors 126 can be provided with a plurality of different second end 130 configurations, which respectively correspond to the support surface 132 of a different type of launch vehicle 116. As such, the spacecraft system 112 can be readily deployed using a variety of different types of launch vehicles 116 by selecting, from among the set of adaptors 126, an adaptor 126 corresponding to a particular type of launch vehicle 116 to be used for a particular launch of the spacecraft system 112.

As noted above, the spacecraft 120A-120F can include satellites and/or interplanetary probes. In the example depicted in FIGS. 3-4, the spacecraft 120A-120F include, among other systems and components, one or more propulsion systems 148, solar panels 150, and/or antennas 152. The propulsion systems 148 can move the spacecraft 120A-120F to and/or maintain the spacecraft 120A-120F in a particular location in orbit. For example, the propulsion system 148 can include an electric propulsion motor (e.g., an ion thruster), a chemical propulsion motor, and/or a hybrid electric/chemical propulsion motor. The solar panels 150 can be part of a power system configured to power electrical components of the spacecraft 120A-120F. For example, the solar panels 150 can generate electricity from the sun, and the generated electricity can then be used to power the spacecraft 120A-120F and/or stored in one or more batteries for later use. The antennas 152 can facilitate transmitting and/or receiving signals for communications between the spacecraft 120A-120F and another spacecraft and/or a ground station.

In addition to the features shown in FIG. 1, the rocket 110 can include additional or alternative features such as, for example, one or more navigation and/or guidance systems (e.g., a satellite navigation system and/or an inertial navigation system), and/or stabilization devices (e.g., one or more fins, Vernier engines, gimbals, and/or gyroscopes).

III. Example Operations

In operation, the launch vehicle 116 is launched into orbit. Once in orbit, the fairing 114 can separate from the launch vehicle 116 or otherwise open to expose the spacecraft system 112 to an external environment (e.g., outer space). The controller 136 can then cause the layers 124A-124C to release, layer by layer, from the stack 122. For example, the controller 136 can transmit signals to the releasable fasteners 134A-134I and, responsive to receiving the signals, the releasable fasteners 134A-134I can actuate from the first state to the second state to release the layers 124A-124C, layer by layer, from the stack 122.

In an example, the controller 136 can wait for a period of time between transmissions of the signals to allow the launch vehicle 116 to travel a predetermined distance between releasing the layers 124A-124C. This can help to deploy the spacecraft 120A-120F from the launch vehicle 116 in relatively close proximity of orbital slots assigned to the spacecraft 120A-120F.

For each layer 124A-124C, after the layer 124A-124C releases from the stack 122, one or more of the biasing devices 138A-138I apply biasing forces to the layer 124A-124C to facilitate separating the layer 124A-124C from the stack 122. By applying the biasing forces to facilitate separating the layer 124A-124C from the stack 122, the risk of collision between the layer 124A-124C and the stack 122 can be reduced or minimized.

Further, as described above, the biasing devices 138A-138I can cause the layer 124A-124C released from the stack 122 to rotate as the layer 124A-124C separates from the stack 122. Within examples, each layer 124A-124C can rotate about an axis that is normal to the sun. By rotating the layer 124A-124C about an axis that is normal to the sun, the spacecraft 120A-120F of the layer 124A-124C can be more equally exposed to sun. This can provide a thermally-stable and power-stable configuration of the spacecraft 120A-120F in the layer 124A-124C during separation from the stack 122.

For each layer 124A-124C, after the layer 124A-124C releases from the stack 122 and/or the adaptor 126, the controller 136 can cause the spacecraft 120A-120F in the layer 124A-124C to release from each other. For example, after each layer 124A-124C releases from the stack 122 and/or the adaptor 126, the controller 136 can wait for a period of time and then transmit a signal to the releasable fastener(s) 134A-134I coupling the spacecraft 120A-120F of the layer 124A-124C. Responsive to receiving the signals, the releasable fasteners 134A-134I can actuate from the first state to the second state to release spacecraft 120A-120F of the layer 124A-124C from each other.

When the spacecraft 120A-120F of the layer 124A-124C release from each other, the biasing device(s) 138G-138I between the spacecraft 120A-120F of the layer 124A-124C facilitate separating the spacecraft 120A-120F from each other. As such, the biasing device(s) 138G-138I can help to reduce or minimize the risk of collision between the spacecraft 120A-120F.

Figure 6A:
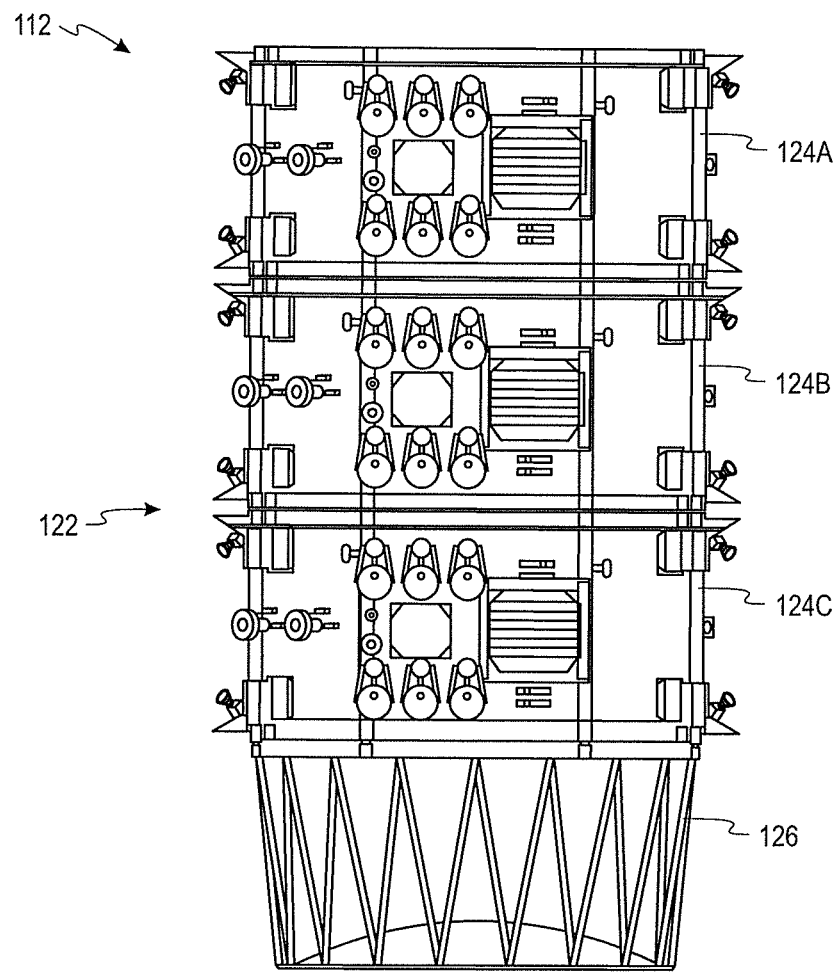
FIGS. 6A-6H depict a spacecraft system deploying spacecraft according to an example embodiment.

In one example, the controller 136 causes the layers 124A-124C to release, layer by layer, in an order from a top-most layer of the stack 122 to a bottom-most layer of the stack 122. FIGS. 6A-6I depict the spacecraft system 112 deploying the spacecraft 120A-120F according to an implementation of this example. FIG. 6A depicts a side view of the spacecraft system 112 according to an example.

Figure 6B:
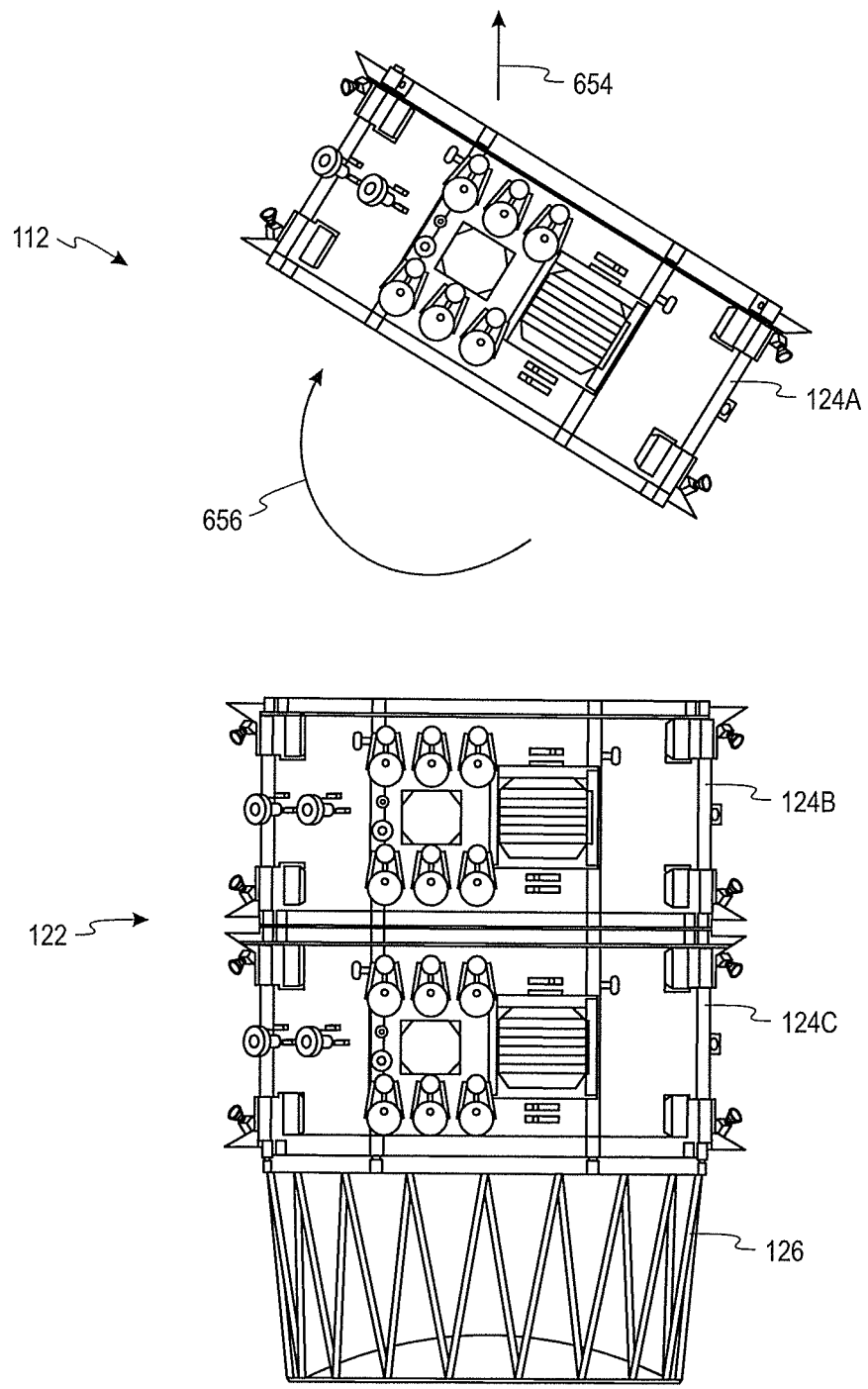

To release the first layer 124A from the stack 122, the controller 136 actuates the second releasable fastener(s) 134B and the third releasable fastener(s) 134C. FIG. 6B depicts the spacecraft system 112 after the first layer 124A releases from the stack 122. As shown in FIG. 6B, responsive to the first layer 124A releasing from the stack 122, the first biasing device(s) 138A and the second biasing device(s) 138B apply biasing forces to the first layer 124A to facilitate separating the first layer 124A from the stack 122 in a direction indicated by arrow 654. The biasing forces applied to the first layer 124A by the first biasing device(s) 138A and the second biasing device(s) 138B also cause the first layer 124A to rotate in a direction indicated by arrow 656.

Figure 6C:
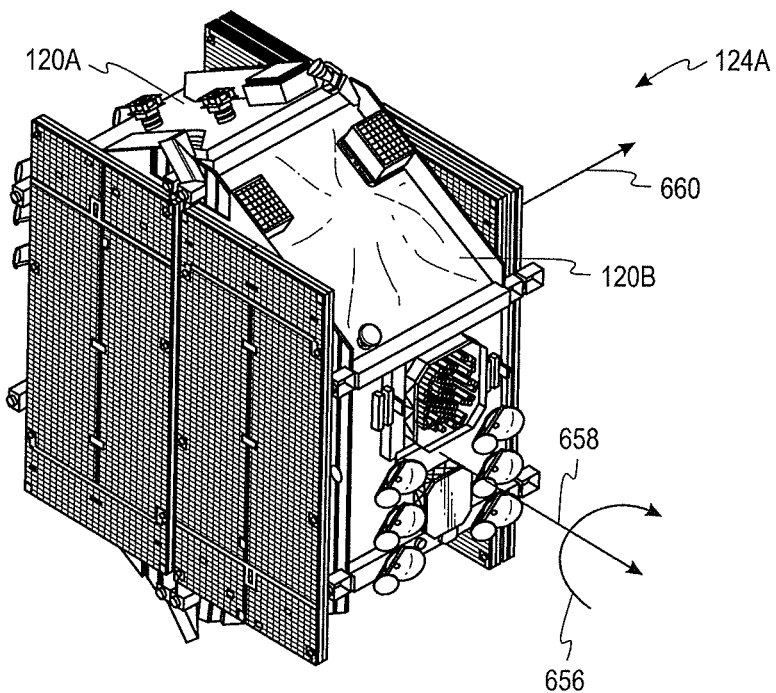

FIG. 6C further illustrates the first spacecraft 120A and the second spacecraft 120B of the first layer 124A rotating in the direction indicated by the arrow 656. As shown in FIG. 6C, the first layer 124A rotates about an axis 658, which is normal to a direction of the sun. The direction of the sun is indicated by an arrow 660 in FIG. 6C.

Figure 6D:
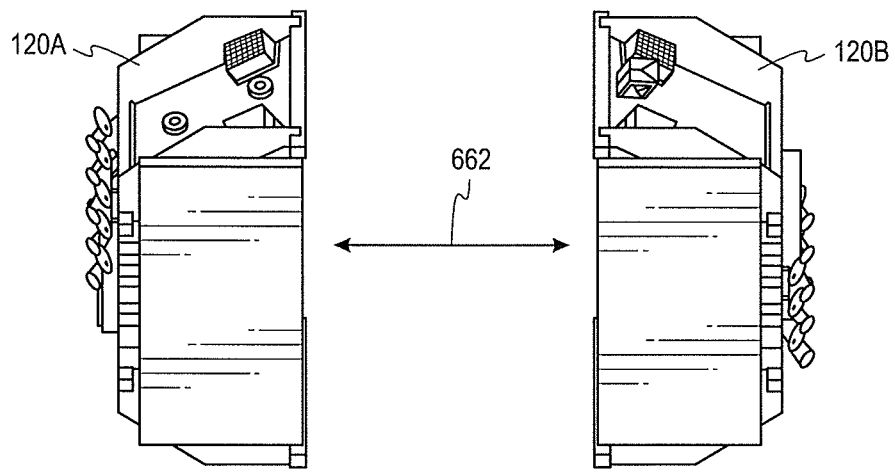

After the first layer 124A releases from the stack 122, the controller 136 actuates the first releasable fastener(s) 134A to release the first spacecraft 120A and the second spacecraft 120B from each other, as shown in FIG. 6D. Responsive to the first spacecraft 120A and the second spacecraft 120B releasing from each other, the seventh biasing device(s) 138G apply a biasing force to the first spacecraft 120A and the second spacecraft 120B to facilitate separating the first spacecraft 120A and the second spacecraft 120B from each other, as indicated by an arrow 662 in FIG. 6D.

Figure 6E:
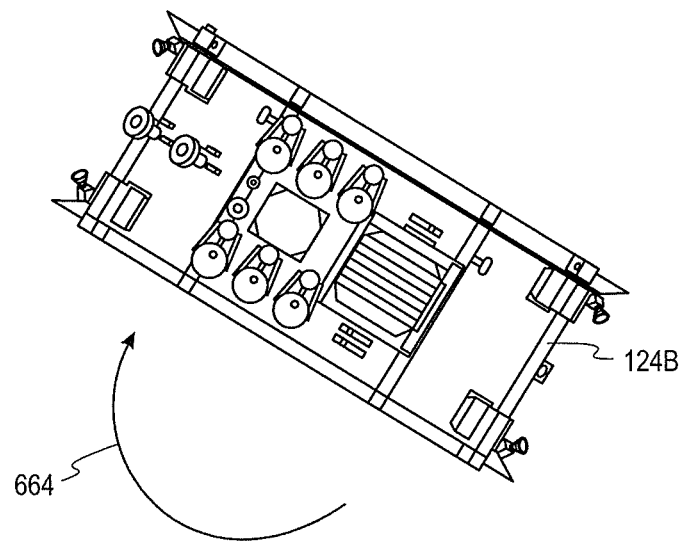
Figure 6E:
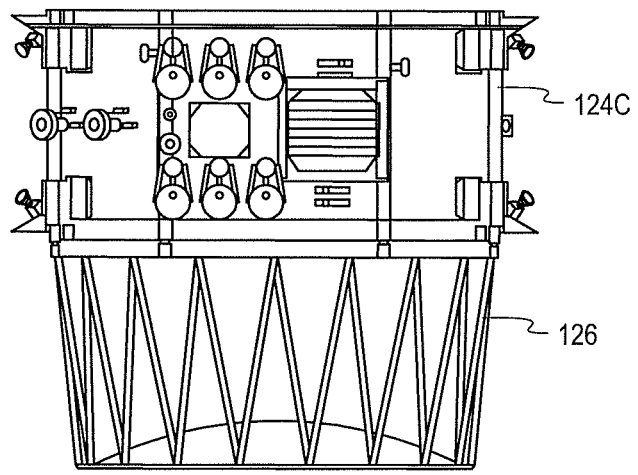

After releasing the first layer 124A from the stack 122 and/or releasing the first and second spacecraft 120A-120B from each other, the controller 136 actuates the fifth releasable fastener(s) 134E and the sixth releasable fastener(s) 134F to release the second layer 124B from the stack 122. FIG. 6E depicts the spacecraft system 112 after the second layer 124B releases from the stack 122. Responsive to the second layer 124B releasing from the stack 122, the third biasing device(s) 138C and the fourth biasing device(s) 138D apply biasing forces to the second layer 124B to facilitate separating the second layer 124B from the stack 122 and rotating the second layer 124B about an axis normal to the sun, as indicated by arrow 664.

Figure 6F:
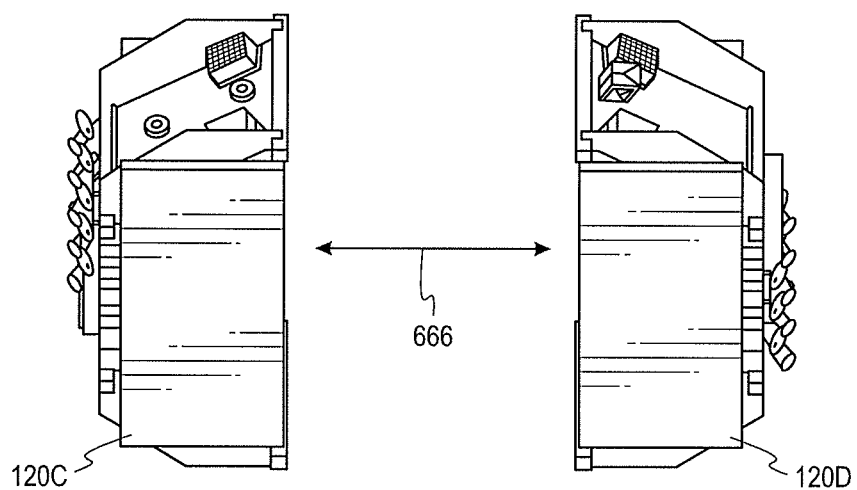

After the second layer 124B releases from the stack 122, the controller 136 actuates the fourth releasable fastener(s) 134D to release the third spacecraft 120C and the fourth spacecraft 120D from each other, as shown in FIG. 6F. Responsive to the third spacecraft 120C and the fourth spacecraft 120D releasing from each other, the eighth biasing device(s) 138H apply a biasing force to the third spacecraft 120C and the fourth spacecraft 120D to facilitate separating the third spacecraft 120C and the fourth spacecraft 120D from each other, as indicated by an arrow 666 in FIG. 6F.

Figure 6G:
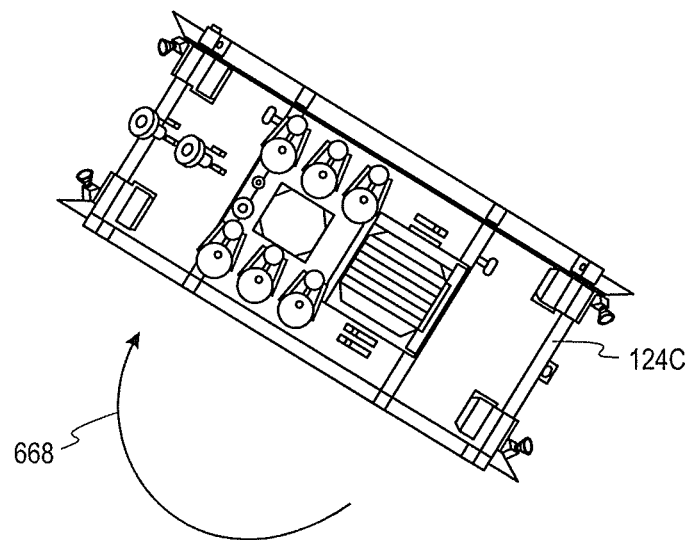
Figure 6G:
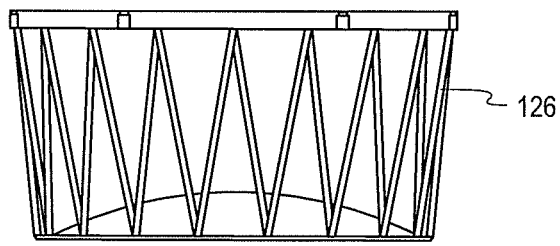

After releasing the second layer 124B from the stack 122 and/or releasing the third and fourth spacecraft 120C-120D from each other, the controller 136 actuates the eighth releasable fastener(s) 134H and the ninth releasable fastener(s) 134I to release the third layer 124C from the adaptor 126. FIG. 6G depicts the spacecraft system 112 after the third layer 124C releases from the adaptor 126. Responsive to the third layer 124C releasing from the adaptor 126, the fifth biasing device(s) 138E and the sixth biasing device(s) 138F apply biasing forces to the third layer 124C to facilitate separating the third layer 124C from the adaptor 126 and rotating the third layer 124C about an axis normal to the sun, as indicated by arrow 668.

Figure 6H:
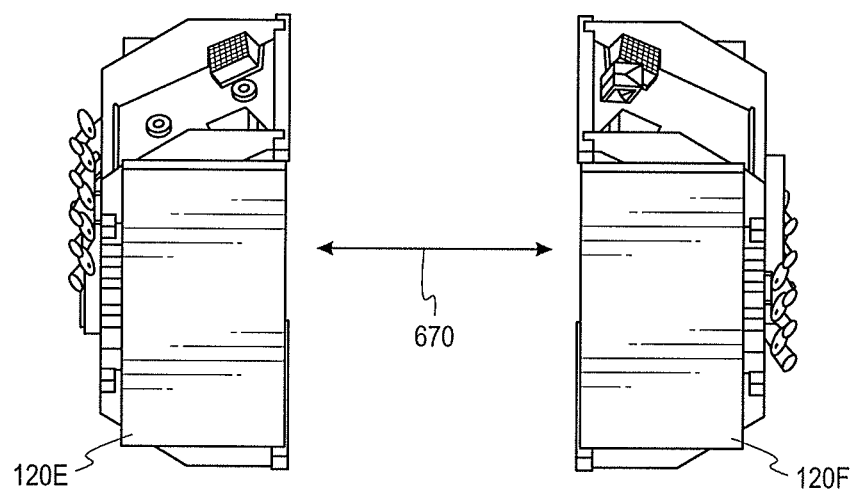

After the third layer 124C releases from the adaptor 126, the controller 136 actuates the ninth releasable fastener(s) 134I to release the fifth spacecraft 120E and the sixth spacecraft 120F from each other, as shown in FIG. 6H. Responsive to the fifth spacecraft 120E and the sixth spacecraft 120F releasing from each other, the ninth biasing device(s) 138I apply a biasing force to the fifth spacecraft 120E and the sixth spacecraft 120F to facilitate separating the fifth spacecraft 120E and the sixth spacecraft 120F from each other, as indicated by an arrow 670 in FIG. 6H.

In the example described above and depicted by FIGS. 6A-6H, the controller 136 causes the layers 124A-124C to release in an order from a top-most layer 124A to a bottom-most layer 124C. In another example, the controller 136 can cause the stack 122 to release from the launch vehicle 116 before the controller 136 causes at least one of the layers 124A-124B to release from the stack 122.

For instance, the controller 136 can be configured to determine that a fault condition occurred during the release process described above (i.e., releasing in an order from the top-most layer to the bottom-most layer). As one example, the controller 136 can determine that a fault condition occurs when a layer 124A-124C does not release responsive to the controller 136 transmitting a signal to trigger release of the layer 124A-124C. Responsive to the controller 136 determining that the fault condition occurred, the controller 136 can cause the stack 122 to release from the adaptor 126 and then cause the layers 124A-124C to release in an order from the bottom-most layer to the top-most layer. As described above, after each layer 124A-124C releases from the stack in this order, the controller 136 causes the spacecraft in the layer 124A-124C to release from each other.

As described above, the layers 124A-124C can each rotate about an axis that is normal to the direction of the sun when released from the stack 122 and/or the adaptor 126. In an example, this can be achieved at least in part by the controller 136 releasing the layer 124A-124C when the launch vehicle 116 is oriented such that a longitudinal axis of the spacecraft system 112 is parallel with the direction of the sun. Additionally, in an example, the controller 136 can release the layers 124A-124C with the spacecraft system 112 at a trailing end of the launch vehicle 116 relative to a direction of travel of the launch vehicle 116. This can further help reduce the risk of collision between the released layer 124A-124C and the stack 122.

Figure 7:
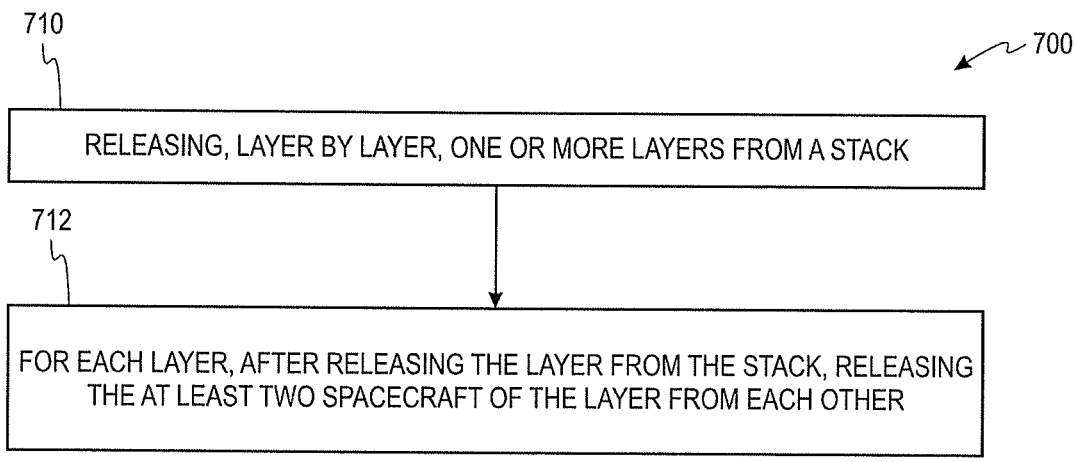
FIG. 7 depicts a flow chart of an example process for deploying spacecraft, according to an example embodiment.

Referring now to FIG. 7, a flow chart for a process 700 of deploying a plurality of spacecraft from a launch vehicle is depicted according to an example embodiment. The plurality of spacecraft are in a stack having one or more layers, each layer includes at least two spacecraft, and each spacecraft is releasably coupled to one or more adjacent spacecraft in the stack. As shown in FIG. 7, the process 700 includes releasing, layer by layer, the one or more layers from the stack at block 710. For each layer, the process 700 also includes after releasing the layer from the stack, releasing the at least two spacecraft of the layer from each other at block 712.

Figure 8:
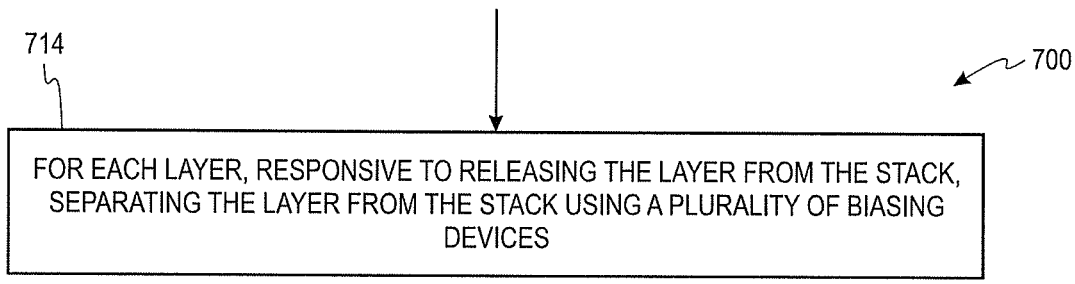
FIG. 8 depicts a flow chart of an example process for deploying spacecraft, according to an example embodiment.
Figure 9:
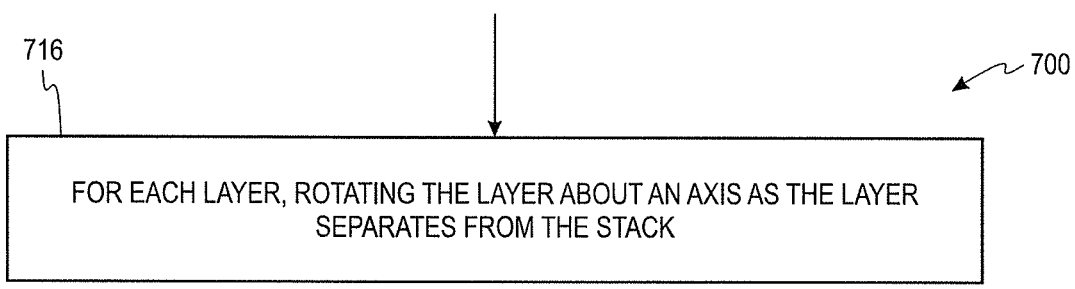
FIG. 9 depicts a flow chart of an example process for deploying spacecraft, according to an example embodiment.
Figure 10:
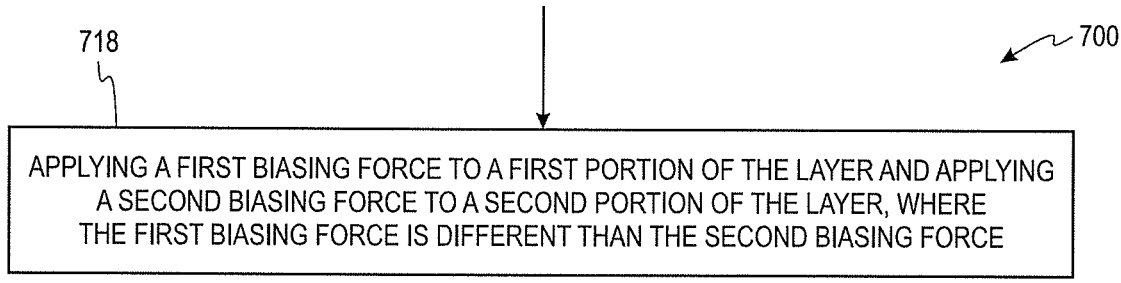
FIG. 10 depicts a flow chart of an example process for deploying spacecraft, according to an example embodiment.

FIGS. 8-12 depict additional aspects of the process 700 according to further examples. As shown in FIG. 8, at block 714, the process 700 can include, for each layer, responsive to releasing the layer from the stack at block 712, separating the layer from the stack using a plurality of biasing devices applying a biasing force between the layer and the stack. As shown in FIG. 9, at block 716, the process 700 can include, for each layer, rotating the layer about an axis as the layer separates from the stack. In an example, the axis is normal to the sun. As shown in FIG. 10, to rotate the layer about the axis at block 716, the process 700 can include applying a first biasing force to first portion of the layer and applying a second biasing force to a second portion of the layer at step 718. The first biasing force can be different than the second biasing force.

Figure 11:
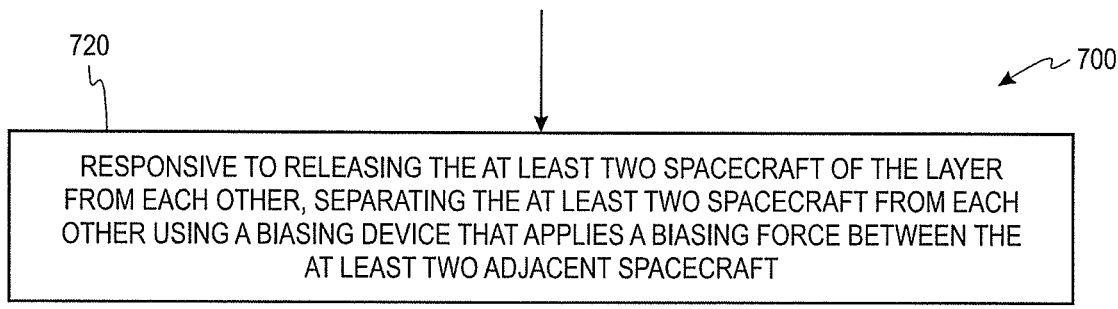
FIG. 11 depicts a flow chart of an example process for deploying spacecraft, according to an example embodiment.
Figure 12:
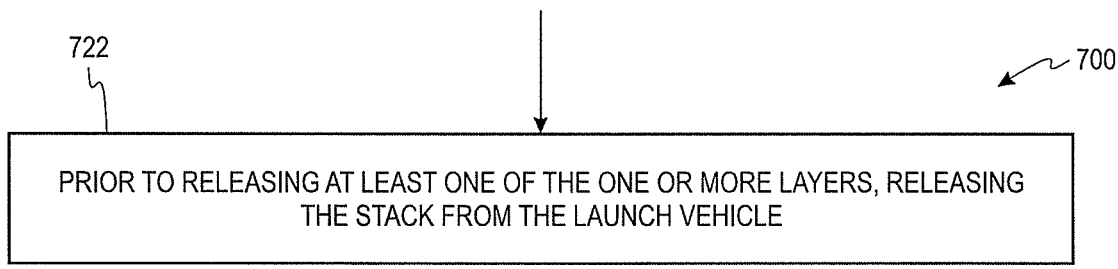
FIG. 12 depicts a flow chart of an example process for deploying spacecraft, according to an example embodiment.

As shown in FIG. 11, at block 720, the process 700 can include, responsive to releasing the at least two spacecraft of the layer from each other at block 712, separating the at least two spacecraft from each other using a biasing device that applies a biasing force between the at least two adjacent spacecraft. In an example, separating the layer from the stack at block 712 and separating the at least two spacecraft from each other at block 720 can be performed entirely passive (e.g., without using thrusters on the spacecraft). As shown in FIG. 12, the process 700 can include, prior to releasing at least one of the one or more layers, releasing the stack from the launch vehicle at block 722.

IV. Example Variations

In the example depicted in FIGS. 2-6H, the spacecraft system 112 includes a stack 122 having three layers 124A-124C with two spacecraft 120A-120F per layer 124A-124C. As described above, the spacecraft system 112 can include greater or fewer layers 124A-124C and/or greater or fewer spacecraft 120A-120F per layer 124A-124C in other examples. In general, the spacecraft system can include a stack having N layers and M spacecraft per layer, wherein N and M are both integer values, where N is greater than or equal to one and M is greater than or equal to two.

Additionally, in the example spacecraft system 112 depicted in FIGS. 2-6H, the third spacecraft 120C and the fourth spacecraft 120D are each coupled to three adjacent spacecraft 120A-120F. However, in another example, the third 120C and/or the fourth spacecraft 120D can be coupled to two spacecraft 120A-120F or one spacecraft 120A-120F. That is, while each spacecraft 120A-120F can be releasably coupled to one or more adjacent spacecraft 120A-120F, a spacecraft 120A-120F need not be coupled to every adjacent spacecraft 120A-120F in some examples.

Further, as noted above, the biasing devices 138A-138I can facilitate separating the layers 124A-124C and/or spacecraft 120A-120F from each other in a passive manner. In an implementation, for each layer 124A-124C, separating the layer 124A-124C from the stack 122 and/or separating the spacecraft 120A-120F in layer 124A-124C from each other can be entirely passive. That is, the biasing devices 138A-138I can facilitate separating the components without the use of the propulsion systems 148 on the spacecraft 120A-120F. In another implementation, the spacecraft 120A-120F can additionally or alternatively use the propulsion systems 148 to facilitate separating the layers 124A-124C from the stack 122 and/or separating the spacecraft 120A-120F from each other.

Example aspects have been described above. After studying the configurations, examples, and arrangements described herein a skilled person may come to understand, however, that changes and modifications may be made without departing from the true scope and spirit of the disclosure. The description of the different advantageous aspects has been presented for purposes of illustration and description, and is not intended to be exhaustive or limited to the form disclosed. After reviewing this disclosure, many modifications and variations will become apparent to those of ordinary skill in the art. Further, different advantageous aspects may provide different advantages as compared to other advantageous aspects. The example aspects selected are chosen and described in order to explain the principles of the disclosure, the practical application, and to enable others of ordinary skill in the art to understand the disclosure with various modifications as are suited to the particular use contemplated.

What is claimed is:

1. A spacecraft system, comprising:
   a plurality of spacecraft in an arrangement, wherein the arrangement has one or more layers, each layer includes at least two spacecraft, and each spacecraft is releasably and directly coupled to one or more adjacent spacecraft in the arrangement;
   a plurality of releasable fasteners, wherein each releasable fastener releasably couples a respective one of the plurality of spacecraft to a respective one of the one or more adjacent spacecraft in the arrangement; and
   a controller configured to perform a set of acts, wherein the set of acts comprise, for each layer:
   cause the layer to release from a launch vehicle, and
   after the layer releases from the launch vehicle, cause the at least two spacecraft in the layer to release from each other.

2. The spacecraft system of claim 1, further comprising an adaptor having a first end coupled to a bottom-most layer of the arrangement, and a second end configured to couple to a launch vehicle.

3. The spacecraft system of claim 2, further comprising a plurality of biasing devices between at least one of (i) the bottom-most layer of the arrangement and the adaptor or (ii) adjacent layers in the arrangement, wherein the plurality of biasing devices apply a biasing force between the at least one of (i) the bottom-most layer of the arrangement and the adaptor or (ii) the adjacent layers to facilitate separating each layer from the launch vehicle after the layer releases from the launch vehicle.

4. The spacecraft system of claim 3, wherein, for each layer of the arrangement, at least one of the plurality of biasing devices applies a different biasing force to the layer than at least another of the plurality of biasing devices such that the layer rotates as the layer separates from the launch vehicle.

5. The spacecraft system of claim 3, wherein the plurality of biasing devices comprises a plurality of springs, and
wherein the at least one of the plurality of biasing devices has a characteristic that is different than a characteristic of the at least another of the plurality of biasing devices, and
wherein the characteristic is at least one of a spring constant or a length.

6. The spacecraft system of claim 1, further comprising a plurality of biasing devices between the at least two spacecraft of each layer,
wherein the plurality of biasing devices apply a biasing force between the at least two spacecraft that facilitates separating the at least two spacecraft from each other after the at least two spacecraft are released from each other.

7. The spacecraft system of claim 1, wherein the controller is configured to:
determine that a fault condition occurred, and
responsive to a determination that the fault condition occurred, cause the arrangement to release from the launch vehicle before the controller causes at least one of the one or more layers to release from the arrangement.

8. The spacecraft system of claim 1, wherein a quantity of layers of the one or more layers is one.

9. The spacecraft system of claim 1, wherein each spacecraft comprises a satellite.

10. The spacecraft system of claim 1, wherein, for each layer, the at least two spacecraft in the layer have substantially the same height.

11. The spacecraft system of claim 1, wherein each releasable fastener comprises a pyrotechnic charge that is configured to be activated remotely by the controller to cause the pyrotechnic charge to break the releasable fastener into a plurality of pieces.

12. A method of dispensing a plurality of spacecraft from a launch vehicle, wherein the plurality of spacecraft are in an arrangement having one or more layers, each layer includes at least two spacecraft, and each spacecraft is releasably and directly coupled to one or more adjacent spacecraft in the arrangement by a respective releasable fastener, the method comprising:
releasing, layer by layer, the one or more layers from a launch vehicle; and
for each layer, after releasing the layer from the launch vehicle, releasing the at least two spacecraft of the layer from each other.

13. The method of claim 12, further comprising, for each layer, responsive to releasing the layer from the launch vehicle, separating the layer from the launch vehicle using a plurality of biasing devices applying a biasing force to the layer.

14. The method of claim 13, further comprising, for each layer, rotating the layer about an axis as the layer separates from the launch vehicle.

15. The method of claim 14, wherein rotating the layer about the axis comprises applying a first biasing force to first portion of the layer and applying a second biasing force to a second portion of the layer, and
wherein the first biasing force is different than the second biasing force.

16. The method of claim 12, further comprising responsive to releasing the at least two spacecraft of the layer from each other, separating the at least two spacecraft from each other using a biasing device that applies a biasing force between the one or more adjacent spacecraft.

17. The method of claim 12, further comprising prior to releasing the one or more layers:
determining a fault condition occurred; and
responsive to determining the fault condition occurred, releasing the arrangement from the launch vehicle.

18. The method of claim 17, wherein determining the fault condition occurred comprises determining that a layer of the one or more layers did not release responsive to a controller transmitting a signal to trigger release of the layer.

19. The method of claim 12, wherein a quantity of layers of the one or more layers is one.

20. A non-transitory computer-readable medium having stored thereon, program instructions that when executed by a controller, cause a spacecraft system to perform a set of acts, wherein the spacecraft system includes a plurality of spacecraft in an arrangement, the arrangement has one or more layers, each layer includes at least two spacecraft, and each spacecraft is releasably and directly coupled to one or more adjacent spacecraft in the arrangement by a respective releasable fastener, the set of acts comprising:
releasing, layer by layer, the one or more layers from a launch vehicle; and
for each layer, after releasing the layer from the launch vehicle, releasing the at least two spacecraft of the layer from each other.

* * * * *